(12) United States Patent
Hayakawa (10) Patent No.: US 12,441,321 B2
(45) Date of Patent: Oct. 14, 2025

(54) DRIVING CONTROL METHOD AND DRIVING CONTROL DEVICE

(71) Applicant: Nissan Motor Co., Ltd., Yokohama (JP)

(72) Inventor: Yasuhisa Hayakawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/691,274

(22) PCT Filed: Sep. 14, 2021

(86) PCT No.: PCT/JP2021/033779
§ 371 (c)(1),
(2) Date: Mar. 12, 2024

(87) PCT Pub. No.: WO2023/042272
PCT Pub. Date: Mar. 23, 2023

(65) Prior Publication Data
US 2024/0416915 A1    Dec. 19, 2024

(51) Int. Cl.
| | |
|---|---|
| B60W 30/18 | (2012.01) |
| B60W 30/12 | (2020.01) |
| B60W 30/16 | (2020.01) |
| B60W 30/182 | (2020.01) |
| B60W 60/00 | (2020.01) |

(52) U.S. Cl.
CPC ...... *B60W 30/18163* (2013.01); *B60W 30/12* (2013.01); *B60W 30/16* (2013.01); *B60W 30/182* (2013.01); *B60W 60/0051* (2020.02); *B60W 2554/4042* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 2008/0249688 A1 | 10/2008 | Sawamoto | |
| 2015/0344033 A1* | 12/2015 | Fukuda | B60W 30/18163 701/117 |
| 2017/0123430 A1* | 5/2017 | Nath | G05D 1/021 |
| 2017/0243491 A1* | 8/2017 | Fujii | G08G 1/167 |
| 2019/0265700 A1* | 8/2019 | Honda | B60W 50/14 |

(Continued)

FOREIGN PATENT DOCUMENTS

| | | |
|---|---|---|
| JP | 2008-254551 A | 10/2008 |
| JP | 2020-104802 A | 7/2020 |
| WO | 2016/113890 A1 | 7/2016 |

*Primary Examiner* — David P. Merlino
(74) *Attorney, Agent, or Firm* — Young Basile Hanlon & MacFarlane, P.C.

(57) ABSTRACT

A driving control device controls driving of a subject vehicle at a predetermined driving assistance level using a processor under a condition of traveling behind a preceding vehicle. The processor determines whether another vehicle is detected in a second lane when the subject vehicle traveling in a first lane at the predetermined driving assistance level changes a lane to the second lane different from the first lane, keeps the traveling of the subject vehicle in the first lane until the other vehicle is detected when the other vehicle is not detected, and executes lane-change control at the predetermined driving assistance level after the other vehicle is detected.

11 Claims, 5 Drawing Sheets

(56) References Cited

U.S. PATENT DOCUMENTS

| | | | |
|---|---|---|---|
| 2019/0276029 A1* | 9/2019 | Umeda | G06V 20/584 |
| 2019/0329782 A1* | 10/2019 | Shalev-Shwartz | B60W 30/162 |
| 2020/0207346 A1 | 7/2020 | Tsuji et al. | |
| 2020/0283025 A1* | 9/2020 | Honda | B60W 60/0025 |
| 2022/0340166 A1* | 10/2022 | Kume | G08G 1/0133 |
| 2023/0356741 A1* | 11/2023 | Hayakawa | B60W 30/18163 |
| 2023/0373526 A1* | 11/2023 | Shimotani | B60W 60/0015 |

* cited by examiner

DRIVING CONTROL METHOD AND DRIVING CONTROL DEVICE

TECHNICAL FIELD

The present invention relates to a driving control method and a driving control device.

BACKGROUND

A driving control method disclosed in JP 2020-104802 A is a method for controlling driving of a subject vehicle at a predetermined driving assistance level under the condition that the subject vehicle follows a preceding vehicle.

SUMMARY

However, by the driving control method disclosed in JP 2020-104802 A, when the subject vehicle traveling by following the preceding vehicle changes a lane, the lane change while maintaining a driving assistance level is possibly not allowed in a case where there is no preceding vehicle in a lane as a destination of the lane change.

A problem to be solved by the present invention is to provide a driving control method and a driving control device capable of executing lane-change control while maintaining a predetermined driving assistance level when a subject vehicle traveling behind a preceding vehicle at the driving assistance level changes a lane.

The present invention solves the above-described problem by, in a case where a subject vehicle traveling in a first lane at a predetermined driving assistance level changes a lane to a second lane, keeping traveling of the subject vehicle in the first lane until another vehicle is detected in the second lane when the other vehicle is not detected in the second lane, and executing lane-change control at the predetermined driving assistance level so that the subject vehicle after the lane change travels behind the other vehicle.

The present invention provides an effect that, since the lane-change control is executed after the other vehicle is detected in the second lane, the lane-change control can be executed while maintaining the predetermined driving assistance level when the subject vehicle traveling behind the preceding vehicle at the driving assistance level changes the lane.

DETAILED DESCRIPTION

Embodiments of the present invention will be described below with reference to the drawings.

First Embodiment

Figure 1:
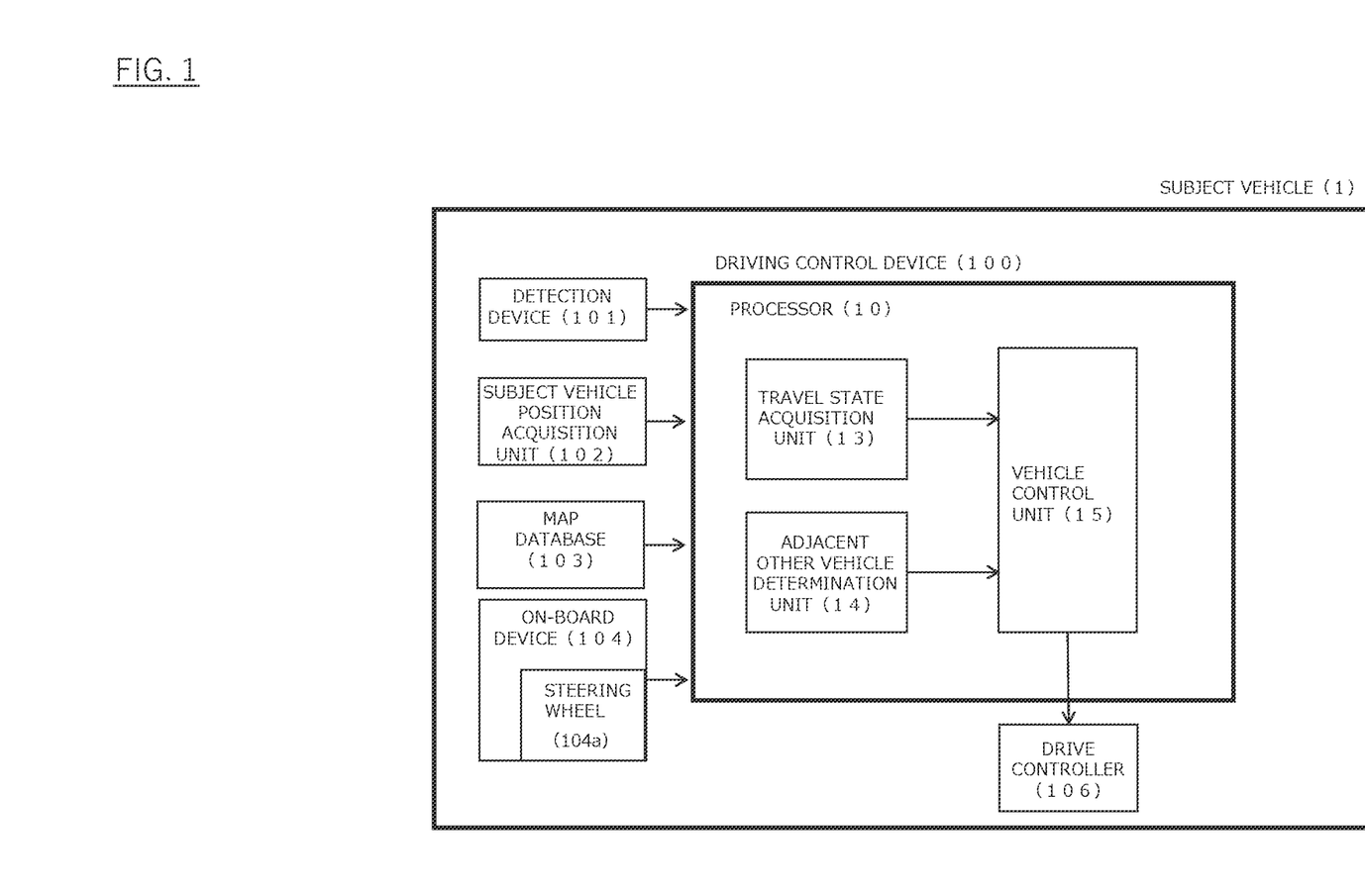
FIG. 1 is a block diagram illustrating a configuration of a driving control device according to a first embodiment.

FIG. 1 is a block diagram illustrating a configuration of a subject vehicle 1 and a driving control device 100 that controls autonomous driving of the subject vehicle 1. The subject vehicle 1 includes the driving control device 100, a detection device 101, a subject vehicle position acquisition unit 102, a map database 103, on-board devices 104, an input device 105, and a drive controller 106.

The driving control device 100 executes a program stored in a ROM by a CPU, thereby autonomously controlling the vehicle speed and steering of the subject vehicle 1 by an autonomous travel control function. The driving control device 100 can set a driving mode corresponding to a driving assistance level, and can assist the travel of the subject vehicle according to the set driving mode. The driving assistance level indicates the degree of intervention when the driving control device 100 assists the driving of a vehicle by means of the autonomous travel control function. The driver's contribution to the driving of the vehicle decreases as the driving assistance level increases. Specifically, the driving assistance level can be set to levels 0 to 5 using the definitions or the like based on SAE J3016 of the Society of Automotive Engineers (SAE). In the level 0, all of the driving operations of the subject vehicle are carried out manually by a driver. In the level 1, although the driving operations of the subject vehicle are primarily carried out by means of manual driving of the driver, the driving control device 100 appropriately assists the manual driving of the driver by means of any of functions such as automatic braking, following, and lane keeping. In the level 2, although the driving operations of the subject vehicle are primarily carried out by means of the manual driving of the driver, under specific conditions, the driving control device 100 can combine a plurality of functions from among an automatic brake function, a following function, a lane keeping function, and the like, thereby executing driving assistance. In the level 3, the driving control device 100 executes all of the driving tasks, but the driver must resume control and be prepared to drive manually when requested by the driving control device 100. In the level 4, the manual driving by the driver is not required, and the driving control device 100 can execute all of the driving tasks and monitor the surrounding conditions of the subject vehicle under specific conditions. In the level 5, the driving control device 100 can execute all of the driving tasks under all conditions. The driving control device 100 switches the above-described driving assistance level automatically or by the driver's operation.

The driving mode corresponding to the level 2 is an eyes-on mode. That is, when the driving assistance level is set to the level 2, the driver needs to visually monitor the surrounding conditions of the subject vehicle 1. When the driving assistance level is set to the level 2, the face direction and the eye movement of the driver are monitored by an in-vehicle camera or the like, and the subject vehicle 1 is allowed to travel when the driver visually confirms the front. Additionally, the driving mode corresponding to the level 2 is a hands-on mode. The hands-on mode is a mode in which autonomous steering control by a processor 10 does not operate when the driver is not holding a steering wheel 104a. Whether the driver is holding the steering wheel 104a is detected by a touch sensor (not illustrated) provided on the steering wheel 104a or a steering torque sensor (not illustrated) of EPS.

The "driver holding the steering wheel 104a" includes not only a state in which the driver is firmly gripping the steering wheel 104a, but also a state in which the driver is lightly touching the steering wheel 104a.

Figure 2:
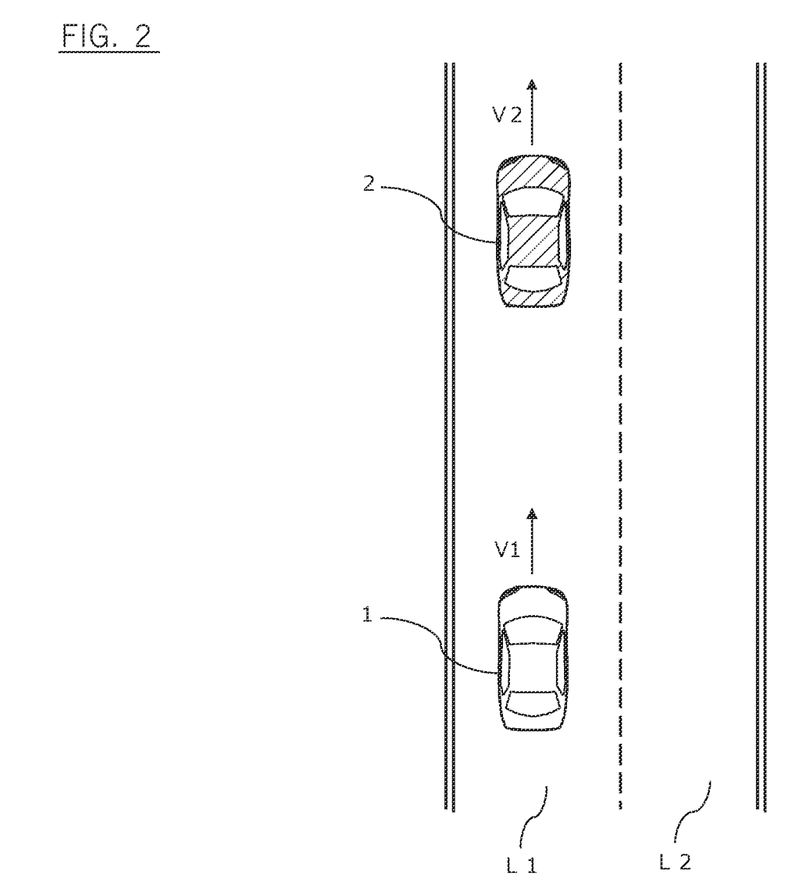
FIG. 2 is a diagram illustrating an example of a positional relation between a subject vehicle and a preceding vehicle.

On the other hand, the driving mode corresponding to the level 3 is an eyes-off mode. That is, when the driving assistance level is set to the level 3, the processor 10 controls the driving of the subject vehicle 1 by the eyes-off mode that permits the subject vehicle 1 to travel in a state where the driver does not visually confirm the front. At this time, the system of the driving control device 100 uses a camera, a radar, or the like to autonomously monitor the surrounding conditions of the subject vehicle. Additionally, the driving mode corresponding to the level 3 is a hands-off mode. The hands-off mode is a mode in which steering control by the processor 10 operates even if driver's hold on the steering wheel 104a is released. That is, when the driving assistance level is set to the level 3, the processor 10 controls the driving of the subject vehicle 1 by the hands-off mode that permits the subject vehicle 1 to travel in a state where driver's hold on the steering wheel of the subject vehicle 1 is released. The driving control device 100 can execute the driving mode corresponding to the level 3 under the condition that the subject vehicle 1 travels behind a preceding vehicle 2 as illustrated in FIG. 2.

Here, the "subject vehicle 1 traveling behind the preceding vehicle 2" includes not only a state in which the subject vehicle 1 travels by following the preceding vehicle 2, but also a state in which the subject vehicle 1 travels behind the preceding vehicle 2 on a travel route on which the preceding vehicle 2 has already traveled without following the preceding vehicle 2. This allows the driving control device 100 to confirm that there is no obstacle on the travel route on which the preceding vehicle 2 has already traveled, that is, in front of the subject vehicle 1 to control the driving of the subject vehicle 1. Additionally, the "subject vehicle 1 traveling by following the preceding vehicle 2" means that the subject vehicle 1 travels in a state where the driving control device 100 controls the driving of the subject vehicle 1 so as to be linked to the movement of the preceding vehicle 2, and controls a vehicle speed V1 of the subject vehicle 1 so as to keep a constant distance between the subject vehicle 1 and the preceding vehicle 2.

The classification of the driving assistance levels is not limited to the classification according to the definitions of the Society of Automotive Engineers, and the driving assistance levels may be defined based on ISO/TC204 of the International Organization for Standardization (ISO). Further, the classification of the driving assistance levels may be defined by other criteria as long as they are appropriately classified in accordance with the degree of intervention of the driving control device 100.

The detection device 101 includes any one or both of a vehicle-mounted camera that photographs surroundings of the subject vehicle 1 or a radar that detects other vehicles and obstacles around the subject vehicle. The detection result of the detection device 101 is output to the driving control device 100 at prescribed time intervals.

The subject vehicle position acquisition unit 102 includes a GPS unit, a gyro sensor, a vehicle speed sensor, and the like. The subject vehicle position acquisition unit 102 detects radio waves transmitted from a plurality of communication satellites by means of the GPS unit, periodically acquires position information about the subject vehicle 1, and detects the current location of the subject vehicle 1 based on the acquired position information about the subject vehicle 1, angle change information acquired from the gyro sensor, and the vehicle speed acquired from the vehicle speed sensor. The position information about the subject vehicle 1 detected by the subject vehicle position acquisition unit 102 is output to the driving control device 100 at prescribed time intervals.

The map database 103 is a memory configured to store high-precision three-dimensional map information that includes position information about various facilities and specific points, and to be accessible from the driving control device 100. The map database 103 stores high-precision digital map information (high-precision map, dynamic map). The high-precision map information includes identification information about a plurality of lanes on roads. The map information of the map database 103 includes three-dimensional position information about curved roads and/or lanes as well as the sizes of the curves (for example, the curvature or the radius of curvature), merging points, branch points, and lane reduction locations. The high-precision map information also includes information regarding facilities, such as service areas and parking areas.

The on-board devices 104 are various devices mounted in the vehicle and function by means of the driver's operation. The on-board devices 104 include a steering wheel 104a. Further, examples of the other on-board devices 104 include an accelerator pedal, a brake pedal, a navigation device, turn signal indicators, wipers, lights, a horn, and other specific switches. When the driver operates the on-board devices 104, the information is output to the driving control device 100.

The drive controller 106 controls the operation of the subject vehicle 1 based on a control command from the driving control device 100. For example, the drive controller 106 controls the operation of a drive mechanism (including the operation of an internal combustion engine in a vehicle with an engine and the operation of a travel motor in an electric vehicle system, and including torque distribution between an internal combustion engine and a travel motor in a hybrid vehicle) and the braking operation for adjusting the acceleration/deceleration and the vehicle speed by means of an autonomous speed control function. Further, the drive controller 106 controls the operation of a steering actuator by means of an autonomous steering control function, thereby executing steering control of the subject vehicle. For example, the drive controller 106 detects a lane marker of a lane in which the subject vehicle travels and controls the travel position (lateral position) of the subject vehicle in the road width direction so that the subject vehicle travels in the center of the lane. Further, the drive controller 106 controls overtaking of a vehicle traveling ahead of the subject vehicle, changes in the travel direction of the subject vehicle, and the like. Further, the drive controller 106 carries out travel control for turning right or left at an intersection or the like. Further, other known methods can be used as the driving control method carried out by the drive controller 106.

Next, the configuration of the driving control device 100 will be described in detail with reference to FIGS. 1 to 3.

In the following description, a "predetermined driving assistance level" is set to the level 3, but is not limited to this. The driving control device 100 can set a driving mode corresponding to another driving assistance level in addition to the level 3.

As illustrated in FIG. 1, the driving control device 100 includes the processor 10. The processor 10 includes the Read Only Memory (ROM) that stores a program for controlling the driving of the subject vehicle 1, the Central Processing Unit (CPU) that executes the program stored in this ROM, and a Random Access Memory (RAM) that functions as an accessible storage device. As an operating circuit, a Micro Processing Unit (MPU), a Digital Signal Processor (DSP), an Application Specific Integrated Circuit (ASIC), a Field Programmable Gate Array (FPGA), and the like can be used in place of or in addition to the Central Processing Unit (CPU). The processor 10 includes a travel state acquisition unit 13, an adjacent other vehicle determination unit 14, and a vehicle control unit 15. The travel state acquisition unit 13, the adjacent other vehicle determination unit 14, and the vehicle control unit 15 execute programs for achieving the respective functions of the processor 10.

While the driving control device 100 is mounted in the subject vehicle 1 in FIG. 1, it is not limited thereto, and the driving control device 100 may be a device that remotely operates the subject vehicle 1.

The travel state acquisition unit 13 acquires the travel state, such as the vehicle speed V1, the acceleration/deceleration, and the driving assistance level of the subject vehicle 1. The travel state acquisition unit 13 determines whether the subject vehicle 1 is traveling behind the preceding vehicle 2 at the predetermined driving assistance level (for example, the level 3) as illustrated in FIG. 2. In the example illustrated in FIG. 2, the vehicle speed V1 of the subject vehicle 1 and a vehicle speed V2 of the preceding vehicle 2 are the same speed.

Figure 3:
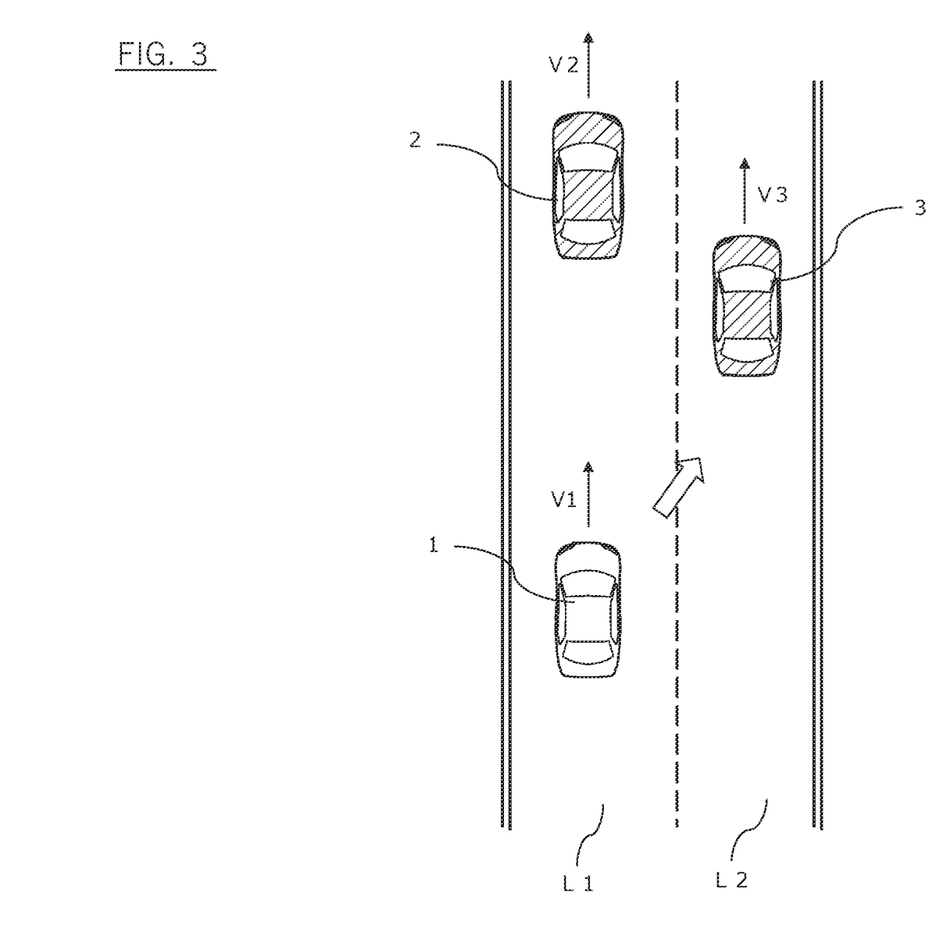
FIG. 3 is a diagram illustrating an example of a positional relation between the subject vehicle, the preceding vehicle, and another vehicle.

The adjacent other vehicle determination unit 14 determines whether another vehicle 3 is detected in a second lane L2 adjacent to a first lane L1 in which the subject vehicle 1 is traveling as illustrated in FIG. 3. When it is determined that the other vehicle 3 is detected, the adjacent other vehicle determination unit 14 acquires a vehicle speed V3 of the other vehicle 3. The adjacent other vehicle determination unit 14 may determine that the other vehicle 3 is detected in the second lane L2 when the vehicle speed V3 of the other vehicle 3 is higher than the vehicle speed V1 of the subject vehicle 1. That is, the adjacent other vehicle determination unit 14 does not need to perform a process of determining that the other vehicle 3 is detected in the second lane L2 when the vehicle speed V3 of the other vehicle 3 is equal to or less than the vehicle speed V1 of the subject vehicle 1. Further, even when the detection device 101 has not directly detected the other vehicle 3, the adjacent other vehicle determination unit 14 may determine that the other vehicle 3 is detected when it is confirmed that the other vehicle 3 is present in front of the subject vehicle 1 in the second lane L2 by any infrastructure information communication means including vehicle-to-vehicle communication and road-to-vehicle communication. The second lane L2 is not limited to a lane adjacent to the first lane L1, and only needs to be a lane different from the first lane L1.

The vehicle control unit 15 keeps the traveling of the subject vehicle 1 in the first lane L1 until the other vehicle 3 is detected in the second lane L2 when the other vehicle 3 is not detected in the second lane L2 as illustrated in FIG. 2, and executes lane-change control of the subject vehicle 1 at the driving assistance level of the level 3 as illustrated in FIG. 3 after the other vehicle 3 is detected. The vehicle control unit 15 may execute the lane-change control at the driving assistance level of the level 3 when the vehicle speed V3 of the other vehicle 3 is higher than the vehicle speed V1 of the subject vehicle 1 (when it is determined that the other vehicle 3 is detected). Additionally, the vehicle control unit 15 may control the driving of the subject vehicle 1 so as not to execute the lane-change control at the driving assistance level of the level 3 when the vehicle speed V3 of the other vehicle 3 is equal to or less than the vehicle speed V1 of the subject vehicle 1 (when it is determined that the other vehicle 3 is not detected). Further, the vehicle control unit 15 maintains the level 3 until a predetermined time elapses after the execution of the lane-change control at the driving assistance level of the level 3 is started.

The predetermined time is time from the start of a lane change of the subject vehicle 1 until the distance between the subject vehicle 1 and the other vehicle 3 becomes a predetermined distance or less. Specifically, the predetermined time for maintaining the driving assistance level at the level 3 is time until the distance between the subject vehicle 1 and the other vehicle 3 becomes the predetermined distance or less when the subject vehicle 1 accelerates at a predetermined acceleration after the lane change. When the subject vehicle 1 travels by following the preceding vehicle 2 at the driving assistance level of the level 3, the predetermined distance may be, for example, an upper limit value of a distance that the subject vehicle 1 can travel by following the other vehicle 3. The predetermined time may be time until the vehicle speed V1 of the subject vehicle 1 that has accelerated at the predetermined acceleration after the lane change reaches a predetermined speed limit. The speed limit is an upper limit value of the vehicle speed set for each road. The predetermined time may be time until it is confirmed that at least two or more other vehicles 3 have passed on a planned travel route of the subject vehicle 1 in the second lane L2 by any infrastructure information communication means including vehicle-to-vehicle communication and road-to-vehicle communication. In this case, the larger the number of the other vehicles 3 that have passed on the planned travel route of the subject vehicle 1 in the second lane L2, the longer the predetermined time may be set.

The vehicle control unit 15 does not start the execution of the lane-change control at the level 3 when the vehicle speed V3 of the other vehicle 3 is higher than the vehicle speed V1 of the subject vehicle 1, and the vehicle speed V3 of the other vehicle 3 is higher than a predetermined value. That is, the vehicle control unit 15 decreases the driving assistance level to the level 2 before executing the lane-change control when the vehicle speed V3 of the other vehicle 3 is higher than the vehicle speed V1 of the subject vehicle 1, and the vehicle speed V3 of the other vehicle 3 is higher than the predetermined value.

Next, a procedure until the execution of the lane-change control of the subject vehicle 1 is started in a driving control method executed by the driving control device 100 will be described by referring to the flowchart illustrated in FIG. 4. The control indicated by Steps S1 to S8 of FIG. 4 is executed, for example, when a traffic jam is present in the first lane L1, and when the subject vehicle 1 changes the lane to the second lane L2 to perform overtaking, but is not limited to this.

Figure 4:
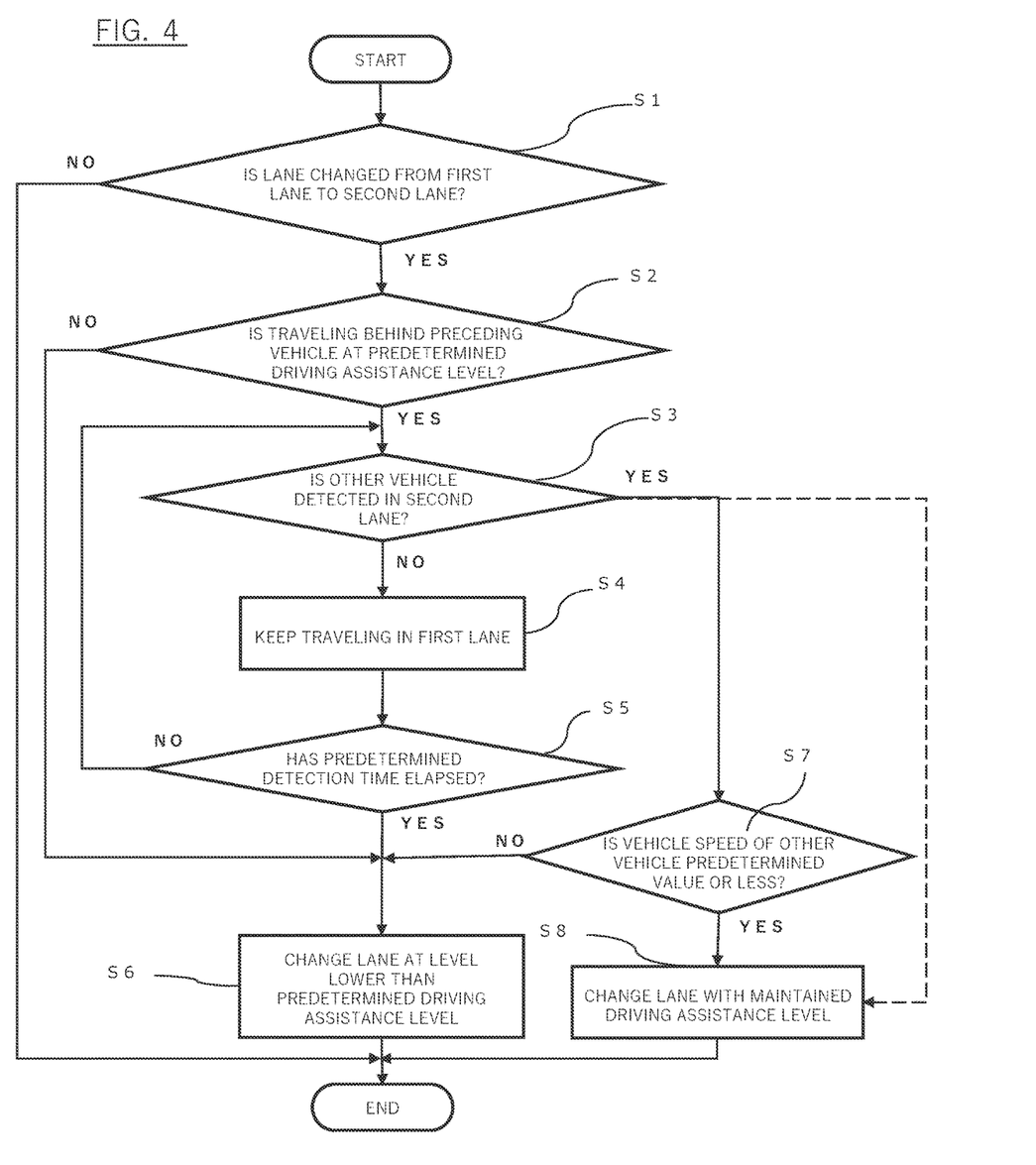
FIG. 4 is a flowchart illustrating a procedure of a driving control method executed by the driving control device illustrated in FIG. 1.

As illustrated in FIG. 4, in Step S1, the processor 10 determines whether the subject vehicle 1 changes the lane from the first lane L1 to the second lane L2 based on the planned travel route of the subject vehicle 1, the map information of the map database 103, the presence or absence of the obstacle detected by the detection device 101, and the like. When the subject vehicle 1 does not change the lane from the first lane L1 to the second lane L2, the control ends.

On the other hand, when the subject vehicle 1 changes the lane from the first lane L1 to the second lane L2, in Step S2, the processor 10 determines whether the subject vehicle 1 is traveling behind the preceding vehicle 2 at the predetermined driving assistance level (level 3). When the subject vehicle 1 is not traveling behind the preceding vehicle 2 at the level 3, in Step S6, the processor 10 performs the lane-change control of the subject vehicle 1 at a driving assistance level (for example, the level 2) lower than the predetermined driving assistance level.

On the other hand, when the subject vehicle 1 is traveling behind the preceding vehicle 2 at the level 3, in Step S3, the adjacent other vehicle determination unit 14 determines whether the other vehicle 3 is detected in the second lane L2. When the other vehicle 3 is detected in the second lane L2, in Step S7, the processor 10 determines whether the vehicle speed V3 of the other vehicle 3 is equal to or less than the predetermined value (for example, a vehicle speed limit). Since the predetermined value is higher than the vehicle speed V1 of the subject vehicle 1, when the vehicle speed V3 of the other vehicle 3 is higher than the predetermined value, the vehicle speed V3 of the other vehicle 3 is higher than the vehicle speed V1 of the subject vehicle 1. When the vehicle speed V3 of the other vehicle 3 is higher than the vehicle speed V1 of the subject vehicle 1, and the vehicle speed V3 of the other vehicle 3 is higher than the predetermined value, in Step S6, the processor 10 performs the lane-change control of the subject vehicle 1 at a level (for example, the level 2) lower than the predetermined driving assistance level (level 3). Meanwhile, when the vehicle speed V3 of the other vehicle 3 is equal to or less than the predetermined value, in Step S8, the processor 10 performs the lane-change control of the subject vehicle 1 at the level 3. That is, the processor 10 does not execute the lane-change control of the subject vehicle 1 at the predetermined driving assistance level when the vehicle speed V3 of the other vehicle 3 is higher than the predetermined value.

On the other hand, in Step S3, when the adjacent other vehicle determination unit 14 determines that the other vehicle 3 is not detected in the second lane L2, in Step S4, the vehicle control unit 15 keeps the traveling of the subject vehicle 1 in the first lane L1. Then, in Step S5, whether a predetermined detection time has elapsed is determined, and when the predetermined detection time has not elapsed, the process returns to Step S3. That is, when the other vehicle 3 is not detected in the second lane L2, the processor 10 keeps the traveling of the subject vehicle 1 in the first lane L1 until the other vehicle 3 is detected in the second lane L2 unless the predetermined detection time elapses.

On the other hand, in Step S5, when it is determined that the predetermined detection time has elapsed while the other vehicle 3 is not detected in the second lane L2, in Step S6, the processor 10 executes the lane-change control of the subject vehicle 1 at the level (for example, the level 2) lower than the predetermined driving assistance level (level 3).

In the flowchart illustrated in FIG. 4, the processor 10 may skip the process of Step S7. That is, when the other vehicle 3 is detected in the second lane L2 in Step S3, the processor 10 may execute the lane-change control at the level 3 regardless of the vehicle speed V3 of the other vehicle 3 in Step S8.

Accordingly, the processor 10 of the driving control device 100 according to the embodiment determines whether the other vehicle 3 is detected in the second lane L2 when the subject vehicle 1 traveling behind the preceding vehicle 2 in the first lane at the predetermined driving assistance level changes the lane to the second lane. Then, when the other vehicle 3 is not detected, the processor 10 keeps the traveling of the subject vehicle 1 in the first lane L1 until the other vehicle 3 is detected, and executes the lane-change control at the predetermined driving assistance level after the other vehicle 3 is detected. This allows the driving control device 100 to execute the lane-change control while maintaining the driving assistance level when the subject vehicle 1 traveling behind the preceding vehicle 2 at the predetermined driving assistance level changes the lane. That is, the driving control device 100 can execute the lane-change control without decreasing the driving assistance level when the subject vehicle 1 changes the lane. Additionally, by the detection of the other vehicle traveling in the second lane L2, the subject vehicle 1 can change the lane toward the second lane L2 in which an obstacle is less likely to be present in a driving mode corresponding to the predetermined driving assistance level.

The processor 10 of the driving control device 100 executes the lane-change control at the predetermined driving assistance level when the vehicle speed V3 of the other vehicle 3 is higher than the vehicle speed V1 of the subject vehicle 1. Meanwhile, when the vehicle speed V3 of the other vehicle 3 is equal to or less than the vehicle speed V1 of the subject vehicle 1, the processor 10 does not execute the lane-change control at the predetermined driving assistance level. That is, the driving control device 100 determines that the other vehicle 3 is detected in the second lane L2 and executes the lane-change control at the predetermined driving assistance level when the vehicle speed V3 of the other vehicle 3 is higher than the vehicle speed V1 of the subject vehicle 1. When the vehicle speed V3 of the other vehicle 3 is equal to or less than the vehicle speed V1 of the subject vehicle 1, the driving control device 100 determines that the other vehicle 3 is not detected at the second lane L2, and does not execute the lane-change control at the predetermined driving assistance level. This allows the subject vehicle 1 to change the lane to the second lane L2 and accelerate to approach the other vehicle 3 and travel behind the other vehicle 3 in the second lane L2 in a driving mode corresponding to the predetermined driving assistance level.

The processor 10 of the driving control device 100 maintains the predetermined driving assistance level until the predetermined time elapses after the execution of the lane-change control at the predetermined driving assistance level is started. This allows the driving control device 100 to control the driving of the subject vehicle 1 without decreasing the driving assistance level until the predetermined time elapses regardless of whether the traveling environment of the subject vehicle 1 meets the condition for the traveling of the subject vehicle 1 at the predetermined driving assistance level.

The above-described predetermined time is time from the start of the execution of the lane-change control by the processor 10 until the distance between the subject vehicle 1 and the other vehicle 3 becomes the predetermined distance or less. This allows the driving control device 100 to maintain the predetermined driving assistance level until the subject vehicle 1 that has changed the lane comes to be able to travel behind the other vehicle 3 with a predetermined inter-vehicular distance.

The above-described predetermined distance may be the upper limit value of the distance that the subject vehicle 1 can travel by following the other vehicle 3. This allows the driving control device 100 to maintain the predetermined driving assistance level until the subject vehicle 1 that has changed the lane comes to be able to travel by following the other vehicle 3.

The above-described predetermined time may be time from the start of the execution of the lane-change control by the processor 10 until the vehicle speed V1 of the subject vehicle 1 reaches the predetermined speed limit. This allows the driving control device 100 to maintain the predetermined driving assistance level until the subject vehicle 1 comes to be able to travel behind the other vehicle 3 traveling at the speed limit or less with the predetermined inter-vehicular distance.

The processor 10 of the driving control device 100 does not execute the lane-change control at the predetermined driving assistance level when the vehicle speed V3 of the other vehicle 3 is higher than the vehicle speed V1 of the subject vehicle 1, and the vehicle speed V3 of the other vehicle 3 is higher than the predetermined value. Accordingly, when the subject vehicle 1 that has changed the lane is less likely to be allowed to travel behind the other vehicle 3 at the predetermined driving assistance level, the driving control device 100 executes the lane-change control at a decreased driving assistance level.

When the driving of the subject vehicle 1 is controlled at the predetermined driving assistance level, the processor 10 of the driving control device 100 controls the driving of the subject vehicle 1 by the hands-off mode that autonomously executes the steering control allowing the subject vehicle 1 to travel in the state where driver's hold on the steering wheel of the subject vehicle 1 is released. This allows the driving control device 100 to control the driving of the subject vehicle 1 by the hands-off mode when the driving of the subject vehicle 1 is controlled at the predetermined driving assistance level (for example, the level 3), thus reducing a driving load on the driver.

When the driving of the subject vehicle 1 is controlled at the predetermined driving assistance level, the processor 10 of the driving control device 100 controls the driving of the subject vehicle 1 by the eyes-off mode that permits the subject vehicle 1 to travel in the state where the driver does not visually confirm the front. This allows the driving control device 100 to control the driving of the subject vehicle 1 by the eyes-off mode when the driving of the subject vehicle 1 is controlled at the predetermined driving assistance level (for example, the level 3), thus reducing a driving load on the driver.

Second Embodiment

Figure 5:
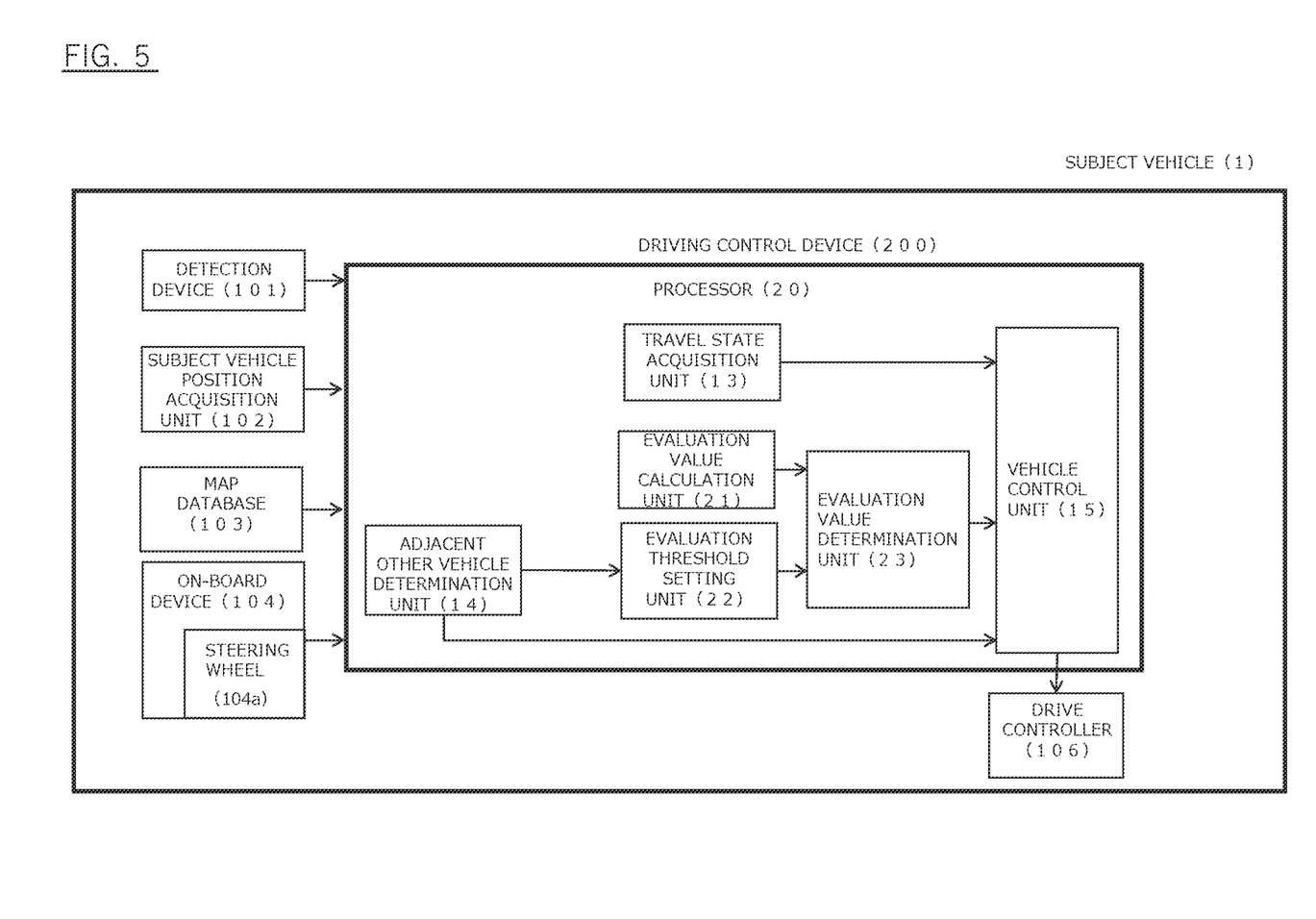
FIG. 5 is a block diagram illustrating a configuration of a driving control device according to a second embodiment.

FIG. 5 is a block diagram illustrating a configuration of a driving control device 200 according to a second embodiment. In the following description, since the same reference numerals as the reference numerals illustrated in FIG. 1 indicate the similar configurations, their detailed descriptions will be omitted.

As illustrated in FIG. 5, a processor 20 of the driving control device 200 includes an evaluation value calculation unit 21, an evaluation threshold setting unit 22, and an evaluation value determination unit 23 in addition to the travel state acquisition unit 13, the adjacent other vehicle determination unit 14, and the vehicle control unit 15.

The evaluation value calculation unit 21 calculates an evaluation value that indicates a sufficiency level of a condition for the subject vehicle 1 to travel at the predetermined driving assistance level. Examples of the condition for the subject vehicle 1 to travel at the predetermined driving assistance level include that the subject vehicle 1 is traveling at a predetermined set speed or less, that the inter-vehicular distance between the subject vehicle 1 and the preceding vehicle 2 or the other vehicle 3 is the predetermined distance or less, that a traffic jam is present around the subject vehicle 1, that the subject vehicle 1 is traveling on a road for which using high-precision map information is effective, that Global Navigation Satellite System (GNSS) signals are effective, that the driver visually confirms the front, that there are no toll booths, motorway exits, merging points, intersections, or lane reduction points in the vicinity of the current location (for example, within about 800 m ahead), and that there are no sharp curves of 100 R or less in the vicinity of the current location (for example, within about 500 m ahead). An evaluation value calculation unit 21 calculates the evaluation value based on one or a plurality of conditions among the above-described conditions. For example, the evaluation value calculation unit 21 may calculate the sufficiency level for each of the plurality of conditions described above, and sum up the calculated sufficiency levels to calculate the evaluation value.

The evaluation threshold setting unit 22 sets an evaluation threshold as a criterion for determining whether the subject vehicle 1 can travel at the predetermined driving assistance level. That is, the evaluation threshold setting unit 22 sets a value corresponding to the condition for the subject vehicle 1 to travel at the predetermined driving assistance level as the evaluation threshold. When the subject vehicle 1 changes the lane at the predetermined driving assistance level after the other vehicle 3 is detected (when the process of Step S8 of FIG. 4 is executed), the evaluation threshold setting unit 22 selects a second evaluation threshold lower than a first evaluation threshold in a case where the subject vehicle 1 is traveling in the first lane L1 at the predetermined driving assistance level as the evaluation threshold. That is, when the vehicle control unit 15 executes the lane-change control of the subject vehicle 1 at the predetermined driving assistance level after the adjacent other vehicle determination unit 14 determines that the other vehicle 3 is detected, the evaluation threshold setting unit 22 relaxes the condition for the subject vehicle 1 to travel at the predetermined driving assistance level compared with a case where the subject vehicle 1 is traveling without changing the lane.

The evaluation value determination unit 23 compares the evaluation value calculated by the evaluation value calculation unit 21 with the evaluation threshold set by the evaluation threshold setting unit 22 to determine whether the evaluation value is equal to or less than the evaluation threshold. Specifically, when the inter-vehicular distance between the subject vehicle 1 and the preceding vehicle 2 or the other vehicle 3 becomes the predetermined inter-vehicular distance or more, the evaluation value determination unit 23 determines that the evaluation value has become the evaluation threshold or less. In this example, a predetermined inter-vehicular distance (for example, a distance corresponding to an inter-vehicle time of 10 seconds) when the subject vehicle 1 changes the lane at the predetermined driving assistance level after the other vehicle 3 is detected is set to be longer than a predetermined inter-vehicular distance (for example, a distance corresponding to an inter-vehicle time of 3 seconds) when the subject vehicle 1 is traveling in the first lane L1 at the predetermined driving assistance level.

The vehicle control unit 15 changes the driving assistance level to a lower level when the evaluation value determination unit 23 determines that the evaluation value has become the evaluation threshold or less. For example, the vehicle control unit 15 changes the driving assistance level from the level 3 to the level 2 when the evaluation value becomes the evaluation threshold or less.

Accordingly, the processor 20 of the driving control device 200 according to the embodiment calculates the evaluation value that indicates the sufficiency level of the condition for the subject vehicle 1 to travel at the predetermined driving assistance level. When the lane-change control of the subject vehicle 1 is executed at the predetermined driving assistance level after the other vehicle 3 is detected, the processor 20 selects the second evaluation threshold lower than the first evaluation threshold in the case where the subject vehicle 1 is traveling in the first lane L1 at the predetermined driving assistance level as the evaluation threshold. Then, the processor 20 changes the driving assistance level to a lower level when the evaluation value has become the evaluation threshold or less. That is, when the subject vehicle 1 changes the lane at the predetermined driving assistance level after the other vehicle 3 is detected, the processor 20 relaxes the condition for the subject vehicle 1 to travel at the predetermined driving assistance level compared with the case where the subject vehicle 1 is traveling without changing the lane. This allows the driving control device 200 to control the driving of the subject vehicle 1 in a state where the driving assistance level is less likely to be decreased when the subject vehicle 1 changes the lane to the second lane L2 at the predetermined driving assistance level.

DESCRIPTION OF REFERENCE NUMERALS

1 Subject vehicle
2 Preceding vehicle
3 Other vehicle
100 Driving control device
10 Processor
14 Adjacent other vehicle determination unit
15 Vehicle control unit
L1 First lane
L2 Second lane

The invention claimed is:

1. A driving control method for controlling driving of a subject vehicle at a predetermined driving assistance level using a processor under a condition that the subject vehicle travels behind a preceding vehicle, the driving control method comprising:
   determining whether an other vehicle is detected in a second lane when the subject vehicle traveling in a first lane at the predetermined driving assistance level changes a lane to the second lane different from the first lane;
   when the other vehicle is not detected, executing lane-change control of the subject vehicle at a driving assistance level lower than the predetermined driving assistance level; and
   when the other vehicle is detected, executing lane-change control at the predetermined driving assistance level so that the subject vehicle after a lane change travels behind the other vehicle.

2. The driving control method according to claim 1, further comprising:
   executing the lane-change control at the predetermined driving assistance level when a vehicle speed of the other vehicle is higher than a vehicle speed of the subject vehicle; and
   not executing the lane-change control at the predetermined driving assistance level when the vehicle speed of the other vehicle is equal to or less than the vehicle speed of the subject vehicle.

3. The driving control method according to claim 2, further comprising maintaining the predetermined driving assistance level until a predetermined time elapses after the execution of the lane-change control at the predetermined driving assistance level is started, wherein
   the predetermined time is time from a start of execution of a lane-change control until a distance between the subject vehicle and the other vehicle becomes a predetermined distance or less.

4. The driving control method according to claim 3, wherein the predetermined distance is an upper limit value of a distance at which the subject vehicle is allowed to travel by following the other vehicle.

5. The driving control method according to claim 2, further comprising maintaining the predetermined driving assistance level until a predetermined time elapses after the execution of the lane-change control at the predetermined driving assistance level is started, wherein
   the predetermined time is time from the start of the execution of the lane-change control until the vehicle speed of the subject vehicle reaches a predetermined speed limit.

6. The driving control method according to claim 1, further comprising maintaining the predetermined driving assistance level until a predetermined time elapses after the execution of the lane-change control at the predetermined driving assistance level is started.

7. The driving control method according to claim 1, further comprising not executing the lane-change control at the predetermined driving assistance level when a vehicle speed of the other vehicle is higher than a vehicle speed of the subject vehicle, and the vehicle speed of the other vehicle is higher than a predetermined value.

8. The driving control method according to claim 1, further comprising, when the driving of the subject vehicle is controlled at the predetermined driving assistance level, controlling the driving of the subject vehicle by a hands-off mode which permits the subject vehicle to travel in a state where driver's hold on a steering wheel of the subject vehicle is released.

9. The driving control method according to claim 1, further comprising, when the driving of the subject vehicle is controlled at the predetermined driving assistance level, controlling the driving of the subject vehicle by an eyes-off mode which permits the subject vehicle to travel in a state where a driver does not visually monitor surrounding conditions of the subject vehicle.

10. The driving control method according to claim 1, further comprising:
    calculating an evaluation value which indicates a sufficiency level of a condition for the subject vehicle to travel at the predetermined driving assistance level;
    selecting a second evaluation threshold lower than a first evaluation threshold in a case where the subject vehicle is traveling in the first lane at the predetermined driving assistance level as an evaluation threshold when the lane-change control of the subject vehicle is executed at the predetermined driving assistance level after the other vehicle is detected; and
    changing the predetermined driving assistance level to a lower level when the evaluation value becomes the evaluation threshold or less.

11. A driving control device which controls driving of a subject vehicle at a predetermined driving assistance level using a processor under a condition that the subject vehicle travels behind a preceding vehicle, the processor configured to:
    determine whether an other vehicle is detected in a second lane when the subject vehicle traveling in a first lane at the predetermined driving assistance level changes a lane to the second lane different from the first lane;

when the other vehicle is not detected, execute lane-change control of the subject vehicle at a driving assistance level lower than the predetermined driving assistance level; and when the other vehicle is detected, execute lane-change control at the predetermined driving assistance level so that the subject vehicle after a lane change travels behind the other vehicle.

\* \* \* \* \*